United States Patent
Russell et al.

(10) Patent No.: US 10,089,555 B2
(45) Date of Patent: Oct. 2, 2018

(54) METHOD, APPARATUS, AND COMPUTER PROGRAM PRODUCT FOR PROVIDING AUTOMATED TESTING OF AN OPTICAL CHARACTER RECOGNITION SYSTEM

(71) Applicant: Hyland Software, Inc., Westlake, OH (US)

(72) Inventors: Steven M. Russell, Alpharetta, GA (US); Balaji Loganathan, Alpharetta, GA (US)

(73) Assignee: HYLAND SOFTWARE, INC., Westlake, OH (US)

(*) Notice: Subject to any disclaimer, the term of this patent is extended or adjusted under 35 U.S.C. 154(b) by 31 days.

(21) Appl. No.: 14/229,108

(22) Filed: Mar. 28, 2014

(65) Prior Publication Data
US 2015/0281739 A1    Oct. 1, 2015

(51) Int. Cl.
G06K 9/03     (2006.01)
G06K 9/52     (2006.01)
G06K 9/68     (2006.01)

(52) U.S. Cl.
CPC ............. *G06K 9/52* (2013.01); *G06K 9/036* (2013.01); *G06K 9/6857* (2013.01); *G06K 2209/01* (2013.01)

(58) Field of Classification Search
None
See application file for complete search history.

(56) References Cited

U.S. PATENT DOCUMENTS

2002/0075496 A1*  6/2002  Zhang .............. G06F 17/30569
                                                    358/1.13

OTHER PUBLICATIONS

Stephen V. Rice, Frank R. Jenkins, and Thomas A. Nartker; The Fifth Annual Test of OCR Accuracy; Apr. 1996; Information Science Research Institute, University of Nevada,TR-96-01.*
Office Document Convert Software, http://download.cnet.com/Office-Convert-Word-Txt-to-Image-Jpg-Jpeg-Free/3000-2079_4-10903027.html, Mar. 27, 2012.*
TeX, LaTeX Stack Exchange, Mar. 25, 2014.*
Stack Overflow, Microsoft Word Template creation with images, Dec. 23, 2013.*
Laura Shoe, http://laurashoe.com, May 6, 2013.*
Biblioscape, Rich Text Format (RTF) Version 1.5 Specification, Oct. 2012.*
Microsoft, Word (.doc) Binary File Format, Feb. 2013.*
On-line-converter, http://document.online-convert.com/convert-to-docx, Jul. 20, 2012.*

* cited by examiner

*Primary Examiner* — Sumati Lefkowitz
*Assistant Examiner* — Jiangeng Sun
(74) *Attorney, Agent, or Firm* — Medley, Behrens & Lewis, LLC (57) ABSTRACT

A method is provided for providing automated testing of an Optical Character Recognition (OCR) system. An automated testing framework may convert original text files to images of various formats and resolutions. The images may comprise various fonts and layouts according to a document type. The images may be processed by the OCR system to generate a converted text file. Converted text files may be compared to original text files and an OCR accuracy score may be calculated.

20 Claims, 7 Drawing Sheets

MED REC:                           M<sup>c</sup>KESSON        Name:      John Doe
\*777707121\*

Name:  John Doe
DOB:  xx/xx/xxxx
Gender:  Male

This section is
Arial 10
200 DPI

MRN:  7777
Account:  xxxxxxxxxx
Admit Date:  xx/xx/xxxx
Discharge Date: xx/xx/xxxx

Patient Discharge Instructions
Name:  John Doe
Address:  123 Main St.
 Cumming, GA 30028
Phone:  (111) 222-3333

Admitting Diagnosis:  Broken Ankle
Discharge Diagnosis:  Broken Ankle

Admitting Physician:  Bob Brooks, M.D.
Attending Physician:  Bob Brooks, M.D.
Primary Care Physician:  Bob Brooks, M.D.

Allergies:  PENICILLINS (Rash)
Most Recent Vital Signs:  BMI Rating: Over  BMI: 29.2  BP#1: 128/70 L arm
 BSA (calc): 2.422  Blood Glucose: 74  Height: 193cm
This section is Arial 9  O₂: 100%  Overall Pain Rating: 8  Pulse #1: 72
 Respirations 18  Weight: 108.9 Kg  Temp #1: 98.5 F oral

This section is Arial 12
Follow Up & Home Care Instructions
Dates of Hospitalization: xx/xx/xxxx 16:53 to xx/xx/xxxx 04:30
Discharged To: Home, self-care
Diet: 1800 Calorie ADA
Activity: As tolerated, stairs with assistance

This section is Arial 8
Follow-up With:

| Entity | When | Details |
|---|---|---|
| Primary Care Physician | 6 day(s) | Dr. Bob Brooks<br>999 2<sup>nd</sup> St.<br>Alpharetta, GA 30005<br>777-333-2222 |
| Home Health Provider | 1 day(s) | GA Home Center<br>12 Medlock Bridge Rd.<br>Roswell, GA 30417<br>444-999-0088 |

Follow-up Lab Work:

| Lab Procedure | When | Details |
|---|---|---|
| CBC | 14 day(s) | Dr. Darin Brooks<br>999 2<sup>nd</sup> St.<br>Alpharetta, GA 30005<br>777-333-2222 |

This section is Arial 11
Form: \*20045\*

Brooks, Garrett    Opt Out:    DOB: xx/xx/xxxx    Patient Discharge Report    Page 1 of 1

| Original text file | Converted Text file | Format type / resolution | Total words in original text | Total words in converted text file | Words matched | Accuracy |
|---|---|---|---|---|---|---|
| DC_Instructions_Arial_11_33.txt | image0022.txt | JPG_200 | 23 | 17 | 8 | 34.00 % |
| DC_Instructions_Arial_11_33.txt | image0046.txt | JPG_300 | 23 | 12 | 7 | 30.00 % |
| DC_Instructions_Arial_11_33.txt | image0070.txt | JPG_600 | 23 | 16 | 12 | 52.00 % |
| DC_Instructions_Arial_11_33.txt | image0094.txt | TIFF_200 | 23 | 11 | 9 | 39.00 % |
| DC_Instructions_Arial_11_33.txt | image0118.txt | TIFF_300 | 23 | 13 | 7 | 30.00 % |
| DC_Instructions_Arial_11_33.txt | image0142.txt | TIFF_600 | 23 | 16 | 9 | 39.00 % |
| DC_Instructions_Arial_11_33.txt | image0166.txt | PNG_200 | 23 | 0 | 0 | 0.00 % |
| DC_Instructions_Arial_11_33.txt | image0190.txt | PNG_300 | 23 | 12 | 7 | 30.00 % |
| DC_Instructions_Arial_11_33.txt | image0214.txt | PNG_600 | 23 | 16 | 12 | 52.00 % |
| DC_Instructions_Cabri_11_33.txt | image0023.txt | JPG_200 | 22 | 14 | 7 | 31.00 % |
| DC_Instructions_Cabri_11_33.txt | image0047.txt | JPG_300 | 22 | 15 | 7 | 31.00 % |
| DC_Instructions_Cabri_11_33.txt | image0071.txt | JPG_600 | 22 | 19 | 12 | 54.00 % |
| DC_Instructions_Cabri_11_33.txt | image0095.txt | TIFF_200 | 22 | 14 | 7 | 31.00 % |
| DC_Instructions_Cabri_11_33.txt | image0119.txt | TIFF_300 | 22 | 14 | 8 | 36.00 % |
| DC_Instructions_Cabri_11_33.txt | image0143.txt | TIFF_600 | 22 | 13 | 4 | 18.00 % |
| DC_Instructions_Cabri_11_33.txt | image0167.txt | PNG_200 | 22 | 12 | 6 | 27.00 % |
| DC_Instructions_Cabri_11_33.txt | image0191.txt | PNG_300 | 22 | 15 | 7 | 31.00 % |
| DC_Instructions_Cabri_11_33.txt | image0215.txt | PNG_600 | 22 | 19 | 12 | 54.00 % |
| DC_Instructions_TNR_11_33.txt | image0024.txt | JPG_200 | 22 | 18 | 13 | 59.00 % |
| DC_Instructions_TNR_11_33.txt | image0048.txt | JPG_300 | 22 | 22 | 0 | 0.00 % |
| DC_Instructions_TNR_11_33.txt | image0072.txt | JPG_600 | 22 | 44 | 14 | 31.00 % |
| DC_Instructions_TNR_11_33.txt | image0096.txt | TIFF_200 | 22 | 13 | 8 | 36.00 % |
| DC_Instructions_TNR_11_33.txt | image0120.txt | TIFF_300 | 22 | 21 | 15 | 68.00 % |
| DC_Instructions_TNR_11_33.txt | image0144.txt | TIFF_600 | 22 | 20 | 14 | 63.00 % |
| DC_Instructions_TNR_11_33.txt | image0168.txt | PNG_200 | 22 | 18 | 14 | 63.00 % |
| DC_Instructions_TNR_11_33.txt | image0192.txt | PNG_300 | 22 | 22 | 0 | 0.00 % |
| DC_Instructions_TNR_11_33.txt | image0216.txt | PNG_600 | 22 | 44 | 14 | 31.00 % |

METHOD, APPARATUS, AND COMPUTER PROGRAM PRODUCT FOR PROVIDING AUTOMATED TESTING OF AN OPTICAL CHARACTER RECOGNITION SYSTEM

TECHNOLOGICAL FIELD

Embodiments of the present invention relate generally to computer technology and, more particularly, to methods, apparatuses, and computer program products for providing automated testing of an Optical Character Recognition (OCR) process.

BACKGROUND

The widespread use of modern computing technology has led to an increasing amount of electronic information stored in a variety of formats. OCR systems convert image file formats to machine-readable text, enabling users to search for text, and making scanned documents and other image formats more usable.

OCR rarely results in a fully accurate conversion of an image to text. Blurred images, unusual fonts, printing inconsistencies, and the like can cause errors to occur in the OCR process, resulting in misinterpreted words, and/or incorrect word counts. Developers may repeatedly adjust OCR processes to improve accuracy based on such inconsistencies, and expand OCR processes to adapt to new document types, layouts, and/or sources. However, in doing so, such adjustments may inadvertently affect OCR accuracy for existing document types.

BRIEF SUMMARY OF SOME EXAMPLE EMBODIMENTS

Methods, apparatuses, and computer program products are therefore provided for providing automated testing of an OCR system.

A method is provided, including receiving an original text file and an indication of an associated document type, converting the original text file to an image having an associated format and associated resolution, causing execution of an Optical Character Recognition (OCR) process against the image, and calculating, with a processor, an accuracy score of the OCR process based on a comparison of the original text file and a converted text file, wherein the converted text file is based on the OCR process.

In some example embodiments, converting the original text file to the image includes converting the original text file to an intermediary input file wherein at least one of a font or a layout of the intermediary input file is based on the associated document type, and converting the intermediary input file to the image.

In some examples, converting the original text file to the image comprises applying a template to the original text file, wherein the template is identified based on at least the associated document type.

In some examples, the method further includes converting the original text file into a plurality of images, each image having a different respective format, repeating the causing of the execution of the OCR process against each of the images, repeating the generation of the resulting text file, and repeating the calculation of the accuracy score of the OCR process for each respective format.

In some examples, the method further includes converting the original text file into a plurality of images, each image having a different respective format, repeating the causing of the execution of the OCR process against each of the images, repeating the generation of the resulting text file, and repeating the calculation of the accuracy score of the OCR process for each respective format.

In some examples, the method includes converting the original text file into a plurality of images, each image having a different respective image resolution, repeating the causing of the execution of the OCR process against each of the images, repeating the generation of the resulting text file, and repeating the calculation of the accuracy score of the OCR process for each respective image resolution.

In some examples, calculating the accuracy score of the OCR process includes calculating a total number of words in the original text file, calculating a total number of words in the converted text file, comparing each word in the converted text file to the original text file to determine whether there is an exact match, and calculating a word accuracy percentage based on the determinations of exact matches and based on the total number of words in the original text file and the converted text file.

A computer program product is provided, the computer program product including at least one non-transitory computer-readable medium having computer-readable program instructions stored therein, the computer-readable program instructions comprising instructions, which when performed by an apparatus, are configured to cause the apparatus to perform at least receiving an original text file and an indication of an associated document type, converting the original text file to an image having an associated format and associated resolution, causing execution of an Optical Character Recognition (OCR) process against the image, and calculating an accuracy score of the OCR process based on a comparison of the original text file and a converted text file, wherein the converted text file is based on the OCR process.

An apparatus is provided, the apparatus including processing circuitry configured to cause the apparatus to perform at least receiving an original text file and an indication of an associated document type, converting the original text file to an image having an associated format and associated resolution, causing execution of an Optical Character Recognition (OCR) process against the image, and calculating an accuracy score of the OCR process based on a comparison of the original text file and a converted text file, wherein the converted text file is based on the OCR process.

An apparatus is provided, the apparatus including means for receiving an original text file and an indication of an associated document type, means for converting the original text file to an image having an associated format and associated resolution, means for causing execution of an Optical Character Recognition (OCR) process against the image, and means calculating an accuracy score of the OCR process based on a comparison of the original text file and a converted text file, wherein the converted text file is based on the OCR process.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Having thus described embodiments of the invention in general terms, reference will now be made to the accompanying drawings, which are not necessarily drawn to scale, and wherein:

FIG. 6 is a portion of an example report generated according to some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to another computing device, it will be appreciated that the data may be sent directly to the other computing device or may be sent to the other computing device via one or more interlinking computing devices, such as, for example, one or more servers, relays, routers, network access points, and/or the like.

A method, apparatus, and computer program product are provided for providing automated testing of an OCR system. As introduced above, OCR systems convert images into machine-readable text. In this regard, an image may be considered any file in a format lacking machine-readable text. Machine-readable text may be considered a sequence of electronic text that may be processed by a computing device.

In some examples, an image may provide text, but the text may not be machine-readable (e.g., only provided in visual format, such as indicated based on the pixels of the image). The text may be provided in various fonts and/or layouts within a single image. For example, a layout may include any number of columns, tables, justification and/or the like that affects placement of text within the image. A font may refer to a different style in which the text is displayed. For example, Arial and Times New Roman are commonly known fonts.

An OCR system may therefore convert a file lacking machine-readable text to a file comprising machine-readable text. Resulting text files of an OCR process may therefore be electronically searched. As used herein, a text file may be considered a computer file comprising machine-readable text. In some examples, the text file may be a file in which the electronic or machine-readable text is embedded in the file, such as a searchable PDF (Portable Document Format). OCR systems may particularly improve the usability of large volumes of data and records, where users may not be able to otherwise manually review every document, but may wish to search for keywords or information within the documents.

The health care industry is an example industry that may benefit from OCR systems and automated testing of an OCR system. Clinics and other healthcare related entities may generate, modify, and/or receive electronic health records (EHRs), lab results, patient visit records, surgery reports and/or the like. Each entity may, in some examples, provide information in a variety of fonts and layouts, which may be captured as images. In some examples, a document may be scanned or faxed. As another example, a client application may generate a record for uploading to a centralized system such as a document management system for medical records. In some examples, the information may be captured in an image format not configured for electronic searching, such as JPG (Joint Photographic Experts Group), TIFF (Tagged Image File Format), PNG (Portable Network Graphics), PDF (Portable Document Format), BMP (Bitmap File) and/or the like. It will be appreciated that while PDFs may comprise embedded electronic text, as described herein with respect to an image, a PDF may be considered to lack embedded machine-readable text. When referred to herein as a searchable PDF, the searchable PDF may be considered to have embedded machine-readable text. Performing OCR on images may facilitate improved usability for a clinic, or the like originating the image, as well as other parties with access to the information, particularly by providing an electronically searchable file.

While the healthcare industry is referred to throughout as an example industry that may benefit from the automated testing of an OCR system, it will be appreciated that embodiments provided herein may be applied to and implemented in systems relating to any type of industry.

According to embodiments provided herein, a process for automatically testing an OCR system is provided. The processes and methods provided herein may be performed routinely, such as on a nightly basis. Changes to OCR processes may therefore be tested on an ongoing basis without involvement from a user. OCR accuracy scores may be calculated based on document types, image resolution, image format, and/or the like. A report including accuracy scores may bring to a developer's attention any detrimental impacts to an OCR system or areas in need of improvement. In some examples, patterns of accuracy scores may be detected and associated with particular document types, image resolutions, and/or image formats, so that the OCR processes may be improved.

Figure 1:
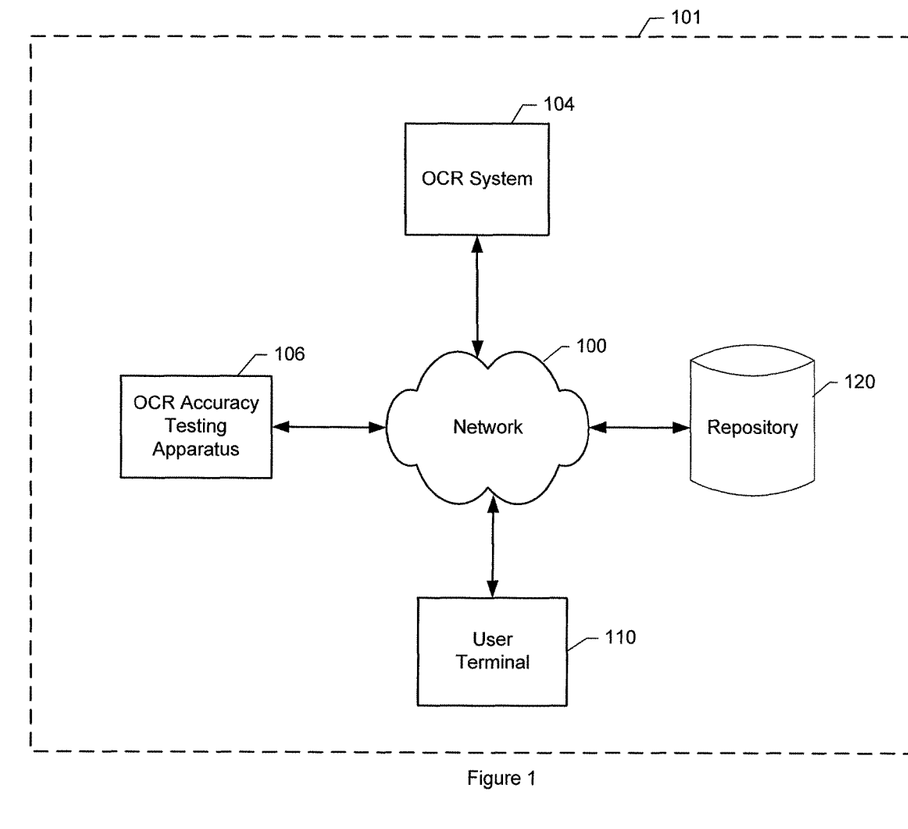
FIG. 1 is a block diagram of a system for providing automated testing of an OCR system according to some example embodiments.

FIG. 1 illustrates a system 101 for providing automated testing of an OCR system according to some example embodiments. It will be appreciated that the system 101, as well as the illustrations in other figures, are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system, numerous other configurations may also be used to implement embodiments of the present invention.

The system 101 may include a network 100, OCR system 104, OCR accuracy testing apparatus 106, user terminal 110 and/or repository 120. The OCR system 104 may be configured to perform OCR processing of image files as introduced above. In some examples, the OCR system 104 may be a live system for processing images received from third party systems and/or clients (not shown), such as those in use by clinics, other healthcare entities, and/or the like. As an alternative embodiment, the OCR system 104 may be implemented in a staging and/or testing region to test OCR processes prior to releasing an OCR process to a "live" system for use by third parties and/or clients.

The OCR accuracy testing apparatus 106 may provide for automated testing of the OCR system 104, according to example embodiments provided herein.

In some example embodiments, OCR accuracy testing apparatus 106 may be embodied as or comprise one or more computing devices. In some example embodiments, OCR accuracy testing apparatus 106 may be implemented as a distributed system or a cloud based entity that may be implemented within network 100. In this regard, OCR accuracy testing apparatus 106 may comprise one or more servers, a server cluster, one or more network nodes, a cloud computing infrastructure, some combination thereof, or the like.

OCR accuracy testing apparatus 106 may be configured to store, or otherwise access, such as from repository 120, original text files to automatically test the OCR system 104. The OCR accuracy testing apparatus 106 may convert the original text files to various image formats and initiate an OCR process on the respective image files, as described in further detail herein. The OCR accuracy testing apparatus 106 may compare resulting converted text files of the OCR process to the corresponding original text files to assess the accuracy of the OCR system 104.

Any number of user terminals 110 may be present and may be embodied as a laptop computer, tablet computer, mobile phone, desktop computer, workstation, or other like computing device. The user terminal 110 may be remote from the OCR system 104, OCR accuracy testing apparatus 106, and/or repository 120, in which case the user terminal 110 may communicate with any of the respective apparatuses via network 100. Additionally or alternatively, a user terminal 110 may be implemented on an OCR system 104 and/or OCR accuracy testing apparatus 106. User terminal 110 may be used by, for example, a developer of the OCR system 104 to upload changes to an OCR process. As used herein, an OCR process and/or OCR codebase may refer to any computer program code utilized by the OCR system 104 in converting an image file to machine-readable text.

In some examples, a user terminal 110 may be configured for accessing and/or viewing a report generated by the OCR accuracy testing apparatus 106. An example report is provided and described herein with respect to FIG. 6. In some examples, a user terminal 110 may be configured for providing an original text file to the repository 120 for the purposes of automated testing of the OCR system 104.

The repository 120 may be embodied as or comprise one or more computing devices configured to store data and provide data upon request to components of system 101. In some examples repository 120 may be configured to store original text files, generated images, and/or the like for testing the OCR system 104 by the OCR accuracy testing apparatus 106.

Network 100 may be embodied in a local area network, the Internet, any other form of a network, or in any combination thereof, including proprietary private and semi-private networks and public networks. The network 100 may comprise a wired network, wireless network (e.g., a cellular network, wireless local area network, wireless wide area network, some combination thereof, or the like), or a combination thereof, and in some example embodiments comprises at least a portion of the Internet.

Figure 2:
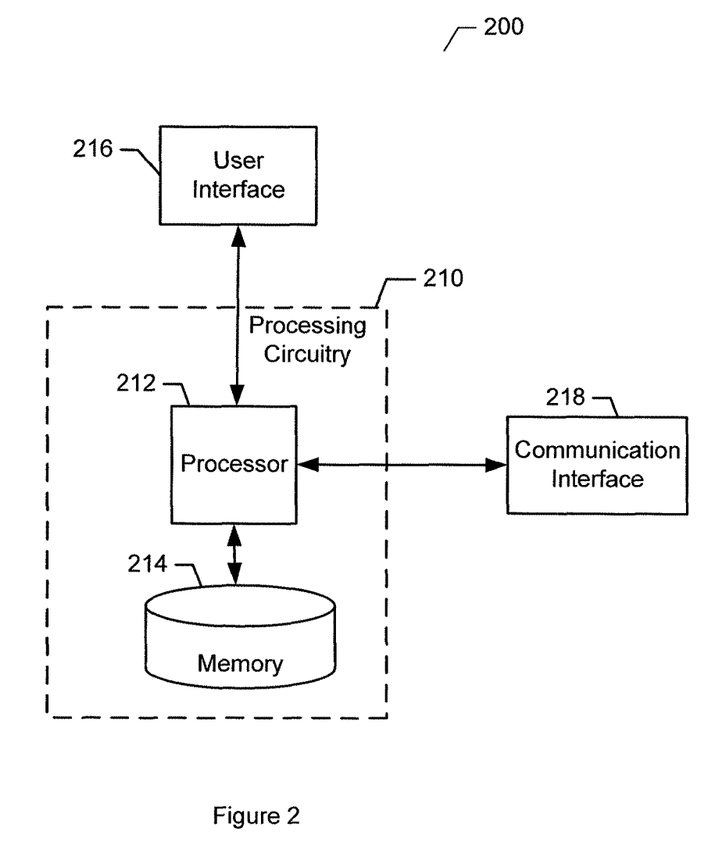
FIG. 2 is a block diagram of an apparatus for providing automated testing of an OCR system according to some example embodiments.

FIG. 2 illustrates an example apparatus 200 that may implement an OCR system 104, OCR accuracy testing apparatus 106, and/or user terminal 110, in accordance with some example embodiments. However, it should be noted that the components, devices, and elements illustrated in and described with respect to FIG. 2 below may not be mandatory and thus some may be omitted in certain embodiments. For example, FIG. 2 illustrates a user interface 216, as described in more detail below, which may be provided by the user terminal 110, but may be optional in the OCR accuracy testing apparatus 106. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of OCR system 104, OCR accuracy testing apparatus 106, and/or user terminal 110 in accordance with various example embodiments. The processing circuitry 210 may be configured to perform data processing, application execution, and/or other processing and management services according to one or more example embodiments. In some embodiments, OCR system 104, OCR accuracy testing apparatus 106, and/or user terminal 110, or a portion(s) or component(s) thereof, such as the processing circuitry 210, may be embodied as or comprise a computing device, e.g., an integrated circuit or other circuitry. The circuitry may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210 may be embodied as a circuit chip (e.g., an integrated circuit) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of OCR system 104, OCR accuracy testing apparatus 106, and/or user terminal 110 as described herein. The plurality of processors may be embodied on a single computing device or distributed across a plurality of computing devices collectively configured to function as OCR system 104, OCR accuracy testing apparatus 106, and/or user terminal 110. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices collectively configured to function as OCR system 104, OCR accuracy testing apparatus 106, and/or user terminal 110. The memory 214 may be configured to store information, data, applications, instructions and/or the like for enabling OCR system 104, OCR accuracy testing apparatus 106, and/or user terminal 110 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents, or data sets. For example, when apparatus 200 is implemented as OCR accuracy testing apparatus 106, the memory 214 may be configured to store original text files, as may be provided by the repository 120. In this regard, memory 214 may include repository 120. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of OCR system 104, OCR accuracy testing apparatus 106, and/or user terminal 110.

The user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a joystick, a display, a touch screen display, a microphone, a speaker, and/or other input/output mechanisms. As such, the user interface 216 may, in some example embodiments, provide means for user control of managing or processing data access operations and/or the like. For example, in instances apparatus 200 is implemented as a user terminal 110, a user may view a report generated by the OCR accuracy testing apparatus 106 via the user interface 216.

In some example embodiments in which OCR system 104 and/or OCR accuracy testing apparatus 106 is embodied as a server, cloud computing system, or the like, aspects of user interface 216 may be limited or the user interface 216 may not be present. Accordingly, regardless of implementation, the user interface 216 may provide input and output means in accordance with one or more example embodiments.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication among OCR system 104, OCR accuracy testing apparatus 106, repository 120, and/or user terminal 110 via network 100. Accordingly, the communication interface 218 may, for example, include supporting hardware and/or software for enabling wireless and/or wired communications via cable, digital subscriber line (DSL), universal serial bus (USB), Ethernet, or other methods.

Figure 3:
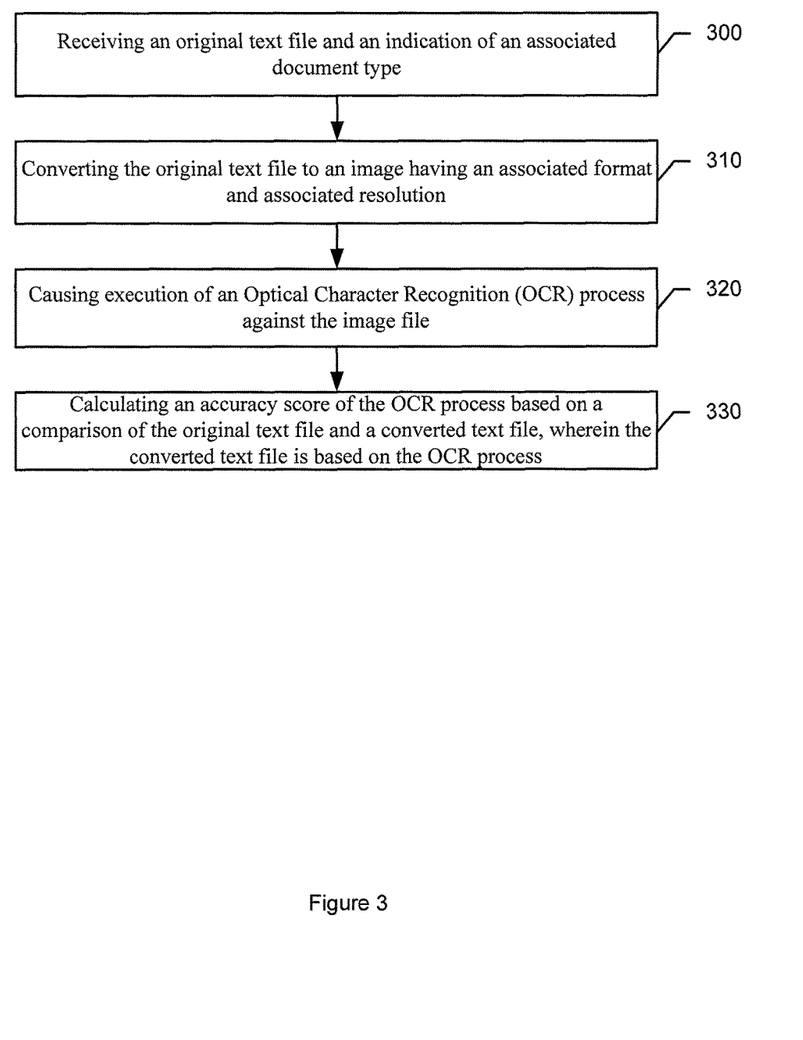
FIG. 3 is a flowchart of operations for providing automated testing of an OCR system according to some example embodiments.

FIG. 3 is a flowchart illustrating example operations of the OCR accuracy testing apparatus 106 according to an example embodiment. As shown by operation 300, OCR accuracy testing apparatus 106 may include means, such as communication interface 218, and/or the like, for receiving an original text file and an indication of an associated document type. For example, the original text file may be retrieved from repository 120, for example, or from memory 214. In some examples, the original text file may be generated by a user of user terminal 110. An original text file may include American Standard Code for Information Interchange (ASCII) encoded text, and/or any other format of machine-readable text, such as those defined by International Organization for Standardization (ISO), for example. The original text file may include text that may appear in an image format of an image processed by the OCR system 104.

The associated document type may include any indication of a document type to be generated from the original text file. Said differently, the associated document type may not be the document type of the original text file, but a document type on which fonts and layouts are based and which will subsequently be applied during conversion to an image, as described below. Example document types may include triage report, lab result, emergency room record, and/or the like. A document type may be indicated in the name of an original text file, for example. Document types may define fonts and layouts based on real-world usage of the OCR system 104. For example, a third party system or client may upload images of a specified document type to the OCR system 104 for conversion. The same document types may be replicated by the OCR accuracy testing apparatus 106 during conversion of an original text file to an image, as described herein.

As shown by operation 310, the OCR accuracy testing apparatus 106 may include means, such as processor 212, and/or the like, for converting the original text file to an image having an associated format and associated resolution. The conversion may include converting the original text file directly to an image. As an alternative, OCR accuracy testing apparatus 106 may convert the original text file to an intermediary input file, then convert the intermediary input file to an image.

Figure 4:
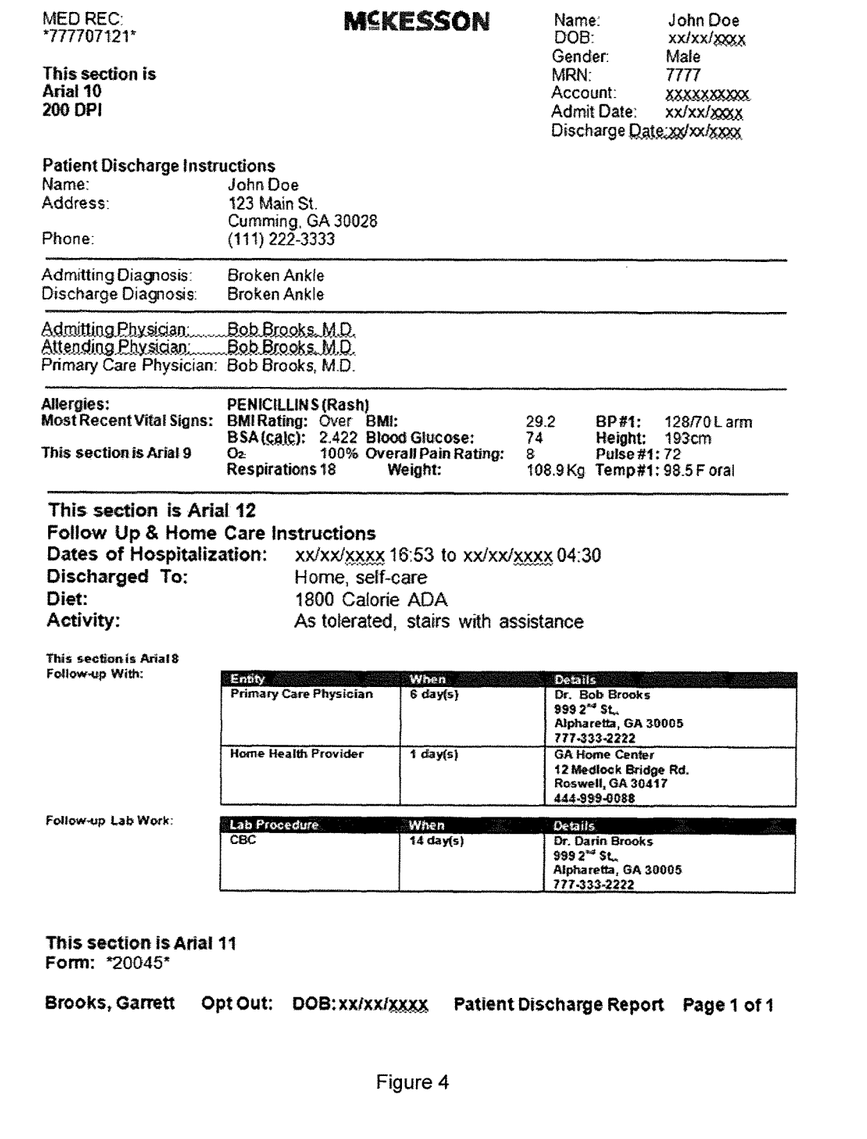
FIG. 4 is an example intermediary input file converted from an original text file according to some example embodiments.

An intermediary input file may be any type of file, such as a word processing file, file including font and/or a layout based on the associated document type. For example, based on the indication of the associated document type, the original text file may be imported into a word processing document. In some examples, a template based on the associated document type may be identified and applied to the original text file to apply fonts and layouts. In this regard, the template may define what fonts and layouts are applied, and a set of templates may be applied, each having a different font and layout schematic. The name of the original text file, such as stored on repository 120, may include an indication of a font, layout, and/or a document type (which in turn may indicate a font and/or layout). In this regard, the name of the original text file may indicate to the OCR accuracy testing apparatus 106 what fonts and/or layouts to apply. As yet another example, an original text file may include special symbols, delimiters, and/or the like for encoding fonts, layouts, and/or document types. According to another example embodiment, a document type may be stored in association with an identifier of the original text file, for example, such as in a table in repository 120. An example intermediary input file generated from an original text file is provided in FIG. 4. Note that the example intermediary input file of FIG. 4 comprises various fonts, and layouts (such as predefined columns and tables).

In example embodiments such as those in which a word processing file is generated, generating the associated image file may be performed via an Application Programming Interface (API) of the word processor. For example, the OCR testing apparatus 106 may invoke a function of the word processor to save the word processing file as an image file having a format of JPG, TIFF, PNG, PDF, BMP and/or the like. In some examples, an intermediary input file may be printed on paper, and scanned by the OCR system 104 to generate images with a specified image format.

In some embodiments, an original text file may be converted to other types of intermediary input files, such as, Hypertext Markup Language (HTML) and/or Extensible Markup Language (XML). Fonts and formats may be embedded in the HTML or XML, and corresponding image files may then be generated from the HTML or XML.

An intermediary input file, as described above, may therefore be considered any file created from an original text file, and subsequently converted to an image file as directed by the OCR accuracy testing apparatus 106.

As another example, OCR accuracy testing apparatus 106 may cause the original text file to be converted to an image file without the use of an intermediary input file. For example, OCR accuracy testing apparatus 106 may be configured to convert the original text file to a bitmap in order to generate an image file such as a BMP or other image file type. In some embodiments, OCR accuracy testing apparatus 106 may be configured to programmatically apply fonts and layouts to the electronic text to generate a bitmap, or other similar data object indicating which pixels of a resulting image will be black or white.

In some embodiments, an image file may be generated in a variety of resolutions (e.g., measurement of clarity and/or detail in the image, such as dots per inch (DPI)) and/or formats (e.g., a predefined standard for encoding data in the image).

In examples in which an intermediary input file (e.g., word processing file, XML, HTML, as described above), is generated to be converted to the image file, a parameter indicating the resolution may be provided to a word processor or other program to indicate the resolution. In some examples, OCR accuracy testing apparatus 106 may be configured for converting the original text file, or intermediary input file, to a number of image files, each having a different resolution. In instances in which no intermediary input file is used, the OCR accuracy testing apparatus 106 may programmatically apply image resolution, such as by varying the number of pixels per image based on a desired resolution. As such, in some examples, the OCR accuracy testing apparatus 106 may be configured to automatically generate a predefined number of images for each original text file, with each image having a distinct resolution.

Similarly, as introduced above, an image may be generated in a variety of formats. For example, one original text file may be converted to a JPG, TIFF, PNG, PDF, BMP and/or the like format. In examples in which an intermediary input file is generated to be converted to the image file, a parameter indicating the image format may be provided to a word processor or other program to indicate the resolution. In an instance in which an intermediary input it not generated, OCR accuracy testing apparatus 106 may programmatically generate images in different formats by adhering to respective encoding standards. In some examples, the OCR accuracy testing apparatus 106 may be configured to automatically generate an image for each type of format of a plurality of formats.

As such, given x number of distinct image resolutions, and y number of image formats, the OCR accuracy testing apparatus 106 may generate x*y image files from one original text file.

In some examples, generated images (and/or any corresponding intermediary input files) may be stored in association with an original text file, such as on repository 120. The original text files and corresponding image files may be accessed in subsequent use. In some embodiments, the generated image files (and/or any corresponding intermediary input files) may be stored on memory 214, and/or may be regenerated by the OCR accuracy testing apparatus 106 as needed, such as during routine testing.

As shown by operation 320, the OCR accuracy testing apparatus 106 may include means, such as processor 212, communication interface 218, and/or the like for causing execution of an OCR process against the image file. For example, the OCR accuracy testing apparatus 106 may call the OCR system 104 to convert image(s) to a format comprising machine-readable text. In this regard, the OCR system 104 may perform the OCR process on the image, as the OCR system 104 would perform the OCR process on a real-life image (e.g., an image generated in practice and not for testing) such as that provided by a third party system and/or client. In other words, the OCR system 104 may respond to requests made by the OCR accuracy testing apparatus 106 as if the requests were made from any other third party system and/or client.

As shown by operation 330, the OCR accuracy testing apparatus 106 may include means, such as processor 212, and/or the like for calculating an accuracy score of the OCR process based on a comparison of the original text file and a converted text file, wherein the converted text file is based on the OCR process. The converted text file may be generated by the OCR system 104. As an alternative example, the OCR system 104 may generate an intermediary output file, which the OCR accuracy testing apparatus 106 may then convert to a text file.

As described above, the resulting text file of the OCR process may be an output of the OCR system 104, and may be a text file comprising electronic (e.g., machine-readable) text. Such a text file may be provided to the OCR accuracy testing apparatus 106 via communication interface 218, for example. In some examples, the converted electronic text may include errors such as misinterpreted words, or the like, and may not accurately represent all text from the image file.

As another example introduced above, the OCR system 104 may generate an intermediary output file, such as a searchable Portable Document Format (PDF) file, which may in turn be converted to a text file by the OCR accuracy testing apparatus 106. While a PDF file is provided as an example intermediary output file generated by the OCR system 104, it will be appreciated that an intermediary output file may include any type of file comprising machine-readable electronic text (which may be embedded in the file). As such, OCR accuracy testing apparatus 106 may be configured to test a variety of OCR systems 104, regardless of the file type generated by the OCR system 104.

For example, in instances in which the OCR system 104 generates an intermediary output file, OCR accuracy testing apparatus 106 may initiate the same OCR process as provided by the OCR system 104, resulting in the same file type as would be generated in a real-world (non-testing) OCR process. The OCR accuracy testing apparatus 106 may convert the intermediary output file to a converted text file for the purposes of comparing the resulting converted text file to the original text file, as described below with respect to FIG. 5.

Figure 5:
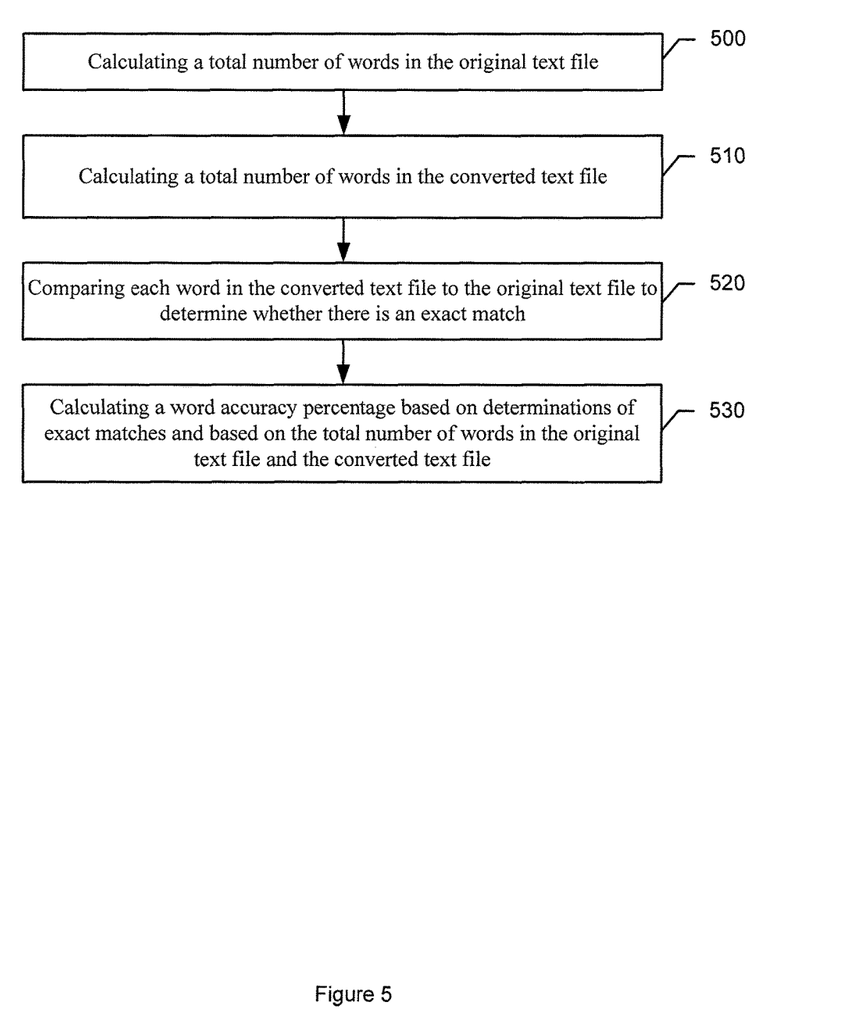
FIG. 5 is a flowchart of operations for calculating OCR accuracy according to some example embodiments.

FIG. 5 is a flowchart of operations for calculating the accuracy of an OCR system 104. Individual accuracies may be calculated for a particular combination of document type (as associated with the original text file), resolution (e.g., DPI), and/or image format type (e.g., JPG, TIFF, PNG, PDF, BMP, and/or the like). As shown by operation 500, the OCR accuracy testing apparatus 106 may include means, such as processor 212, and/or the like, for calculating a total number of words in the original text file. For example, OCR accuracy testing apparatus 106 may perform a word count on the original text file and/or the intermediary input file. For example, OCR accuracy testing apparatus 106 may invoke a word count function of an API of a word processing program or the like. As an alternative, the OCR accuracy testing apparatus 106 may be configured to count the words of the original text file and/or intermediary input file, such as by counting a number of space characters.

Similarly, as shown by operation 510, the OCR accuracy testing apparatus 106 may include means, such as processor 212, and/or the like, for calculating a total number of words in the converted text file. As described above, a word count may be performed on a converted text file based on a count of space characters.

As shown by operation 520, the OCR accuracy testing apparatus 106 may include means, such as processor 212, and/or the like, for comparing each word in the converted text file to the original text file to determine whether there is an exact match. In this regard, the processor 212 may traverse each word of the converted text file and the original text file, and track, such as with memory 214, the number of matches and non-matches. The respective files may be parsed based on identified space characters and processed accordingly.

As shown by operation 530, the OCR accuracy testing apparatus 106 may include means, such as processor 212, and/or the like, for calculating a word accuracy percentage based on determinations of exact matches and based on the total number of words in the original text file and the converted text file. In some examples, the calculation may be the number of matched words÷the total number of words in the original text file. Numerous other calculations may be performed to provide an accuracy of the OCR system 104.

FIG. 6 illustrates a portion of an example report generated by OCR accuracy testing apparatus 106. Such a report may be provided in a spreadsheet format and/or as a file comprising comma separated values, for example. Each row of the report provides data associated with an automated test of the OCR system 104, as described herein. The report provides, for each test and from left to right, an original text file name, converted text file name, image format type (e.g., JPG, TIFF, PNG, and/or the like) and resolution (e.g., DPI), total words in the original text file as calculated with respect to operation 500, total words in converted text file, as calculated with respect to operation 510), number of words matched (e.g., as calculated with respect to operation 520), and a percent accuracy score of the OCR system 104 for the respective test. Note that area 600 indicates that a same original text file named "DC_Instructions_Arial_11_33.txt" was tested several times, each test including a conversion to a different format type and resolution, as indicated in area 610.

As such, the OCR accuracy testing apparatus 106 may include means for converting the original text file into a plurality of image files, each image file having a different respective format and/or resolution. The operations described with respect to FIG. 3 may therefore be repeated for all or any of the potential format and resolution combinations. The number of tests run for each original text file may therefore be calculated by the number of image formats to test the number of distinct resolutions to test.

Since the operations of the OCR accuracy testing apparatus 106 are automated so as to be performed automatically without manual intervention, the OCR accuracy testing apparatus 106 may perform tests on an extensive number of document types, and for each document type, apply any number of image formats and/or resolutions. A resulting report, such as the example report of FIG. 6, may allow a user to manipulate the data to pinpoint areas of weakness, and compare a report to prior reports to identify changes in accuracy among document types, resolutions, and/or image formats. In some examples, the OCR accuracy testing apparatus 106 may be configured to flag accuracy scores or percentages below a specified threshold. As another example, results may be grouped and their respective accuracy scores averaged by document type, resolution, and/or image formats so that users may identify trends in OCR accuracy. Such reports may guide OCR developers into improving an OCR process for a particular document type, while monitoring OCR accuracy for other document types and to ensure stability.

Figure 7:
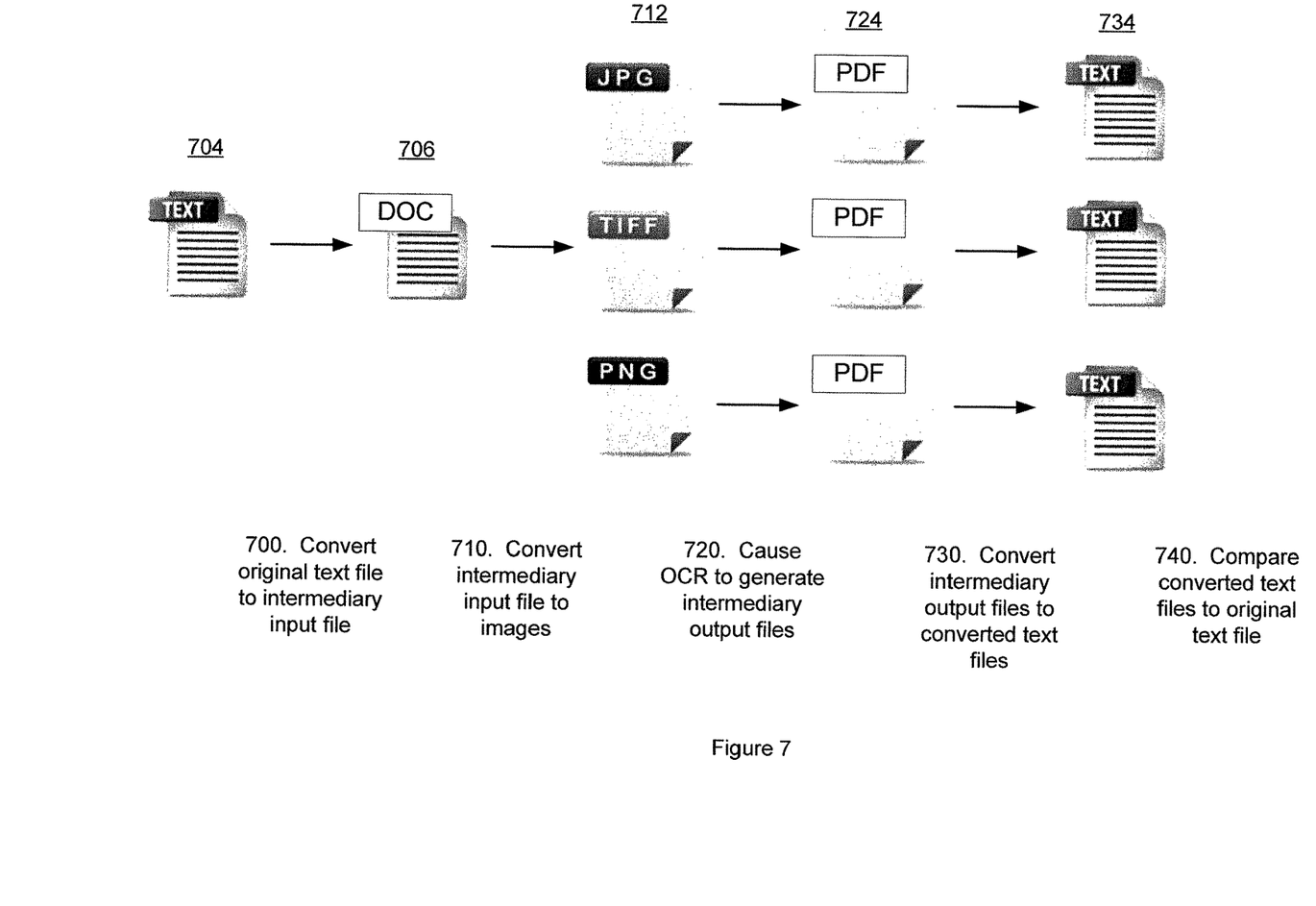
FIG. 7 is a diagram illustrating file conversions according to some example embodiments.

FIG. 7 is a diagram illustrating file conversions according to some example embodiments. As shown by operation 700, the OCR accuracy testing apparatus 106 may include means, such as processor 212, for converting an original text file 704 to an intermediary input file 706. The intermediary input file may be generated so as to advantageously utilize functionality provided by a word processor or other program to apply fonts and layouts to a text file. Such a conversion is described above with respect to operation 310.

As shown by operation 710, the OCR accuracy testing apparatus 106 may include means, such as processor 212, for converting the intermediary input file 706 to an image file(s) 712. Converting the intermediary input file 706 to image(s) 712 may include advantageously utilizing an API of a word processor or other program. The image(s) 712 may be formatted in a variety of formats (e.g., JPG, TIFF, PNG, etc.), and resolutions (not shown). The conversion from intermediary input file to image is described above with respect to operation 310.

As shown by operation 720, the OCR accuracy testing apparatus 106 may include means, such as processor 212, for causing execution of an OCR process on each of the images 712. In some examples, as described above with respect to operation 320, OCR testing apparatus 106 may invoke OCR system 104, which may generate an intermediary output file(s) 724, such as a searchable PDF, for each image 712. In this regard, the intermediary output file may be a format which the OCR system 104 is configured to generate, and may comprise embedded machine-readable or electronic text.

As shown by operation 730, the OCR accuracy testing apparatus 106 may include means, such as processor 212, for converting intermediary output files 724 to converted text files 734. As described above with respect to operation 330, the OCR accuracy testing apparatus 106 may convert intermediary output files generated by OCR system 104 to text files.

As shown by operation 740, the OCR accuracy testing apparatus 106 may include means, such as processor 212, for comparing text files 734 to the corresponding original text file 704, as described above with respect to operation 330. Corresponding accuracy scores may then be calculated, as also described above with respect to operation 330.

Embodiments provided herein provide for automated testing of OCR systems. The OCR accuracy testing apparatus 106 may be configured to perform tests according to example embodiments provided herein, on a routine basis, such as based on a nightly cycle. Such configurations may enable testing to occur with little to no human involvement. Accuracy scores calculated by the OCR accuracy testing apparatus 106 may be reviewed by developers and/or internal users of the OCR system 104. Document types, image formats, and/or resolutions having associated low OCR accuracy scores may be flagged so that a developer may troubleshoot problem areas. An OCR system may therefore be tweaked and improved, while the OCR testing apparatus 106 provides ongoing testing and monitoring outputs of the OCR system to ensure product stability. Embodiments provided herein may therefore lead to improved OCR systems.

FIGS. 3, 5 and 7 illustrate operations of a method, apparatus, and computer program product according to some example embodiments. It will be understood that each operation of the flowcharts or diagrams, and combinations of operations in the flowcharts or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, OCR system 104, OCR accuracy testing apparatus 106, and/or user terminal 110) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, OCR system 104, OCR accuracy testing apparatus 106, user terminal 110, and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method executed by a processor of an optical character recognition (OCR) accuracy testing apparatus for testing an OCR process on a healthcare document, the method comprising:
   receiving an original text file and a template for the healthcare document, the healthcare document being one of an electronic health record, a lab result, a patient visit record, a triage report, an emergency room report, or a surgery report, wherein the original text file comprises machine-readable text, wherein the template defines a font and a layout to be applied to the text in the original text file;

automatically converting the original text file according to the font and the layout defined by the template to generate a plurality of images of different file formats, each image in the plurality of images having pixels indicative of the text, an associated resolution, and the font and the layout defined by the template;

causing the OCR process to be executed for each image in the plurality of images to generate a converted text file for each image, the converted text file for each image comprising second machine-readable text, wherein the second machine-readable text is based upon the pixels;

calculating, with the processor, an accuracy score of the OCR process for each image in the plurality of the images based on a comparison of the text in the original text file and the second text in the converted text file for each image; and flagging an image in the plurality of images when an accuracy score of the OCR process associated with the image is below a threshold score, wherein flagging the image indicates that a problem exists in the OCR process with respect to a file format of the image and the template.

2. The method of claim 1, wherein converting the original text file comprises:

prior to generating the plurality of images of different file formats, converting the original text file to generate a plurality of intermediary word processing input files, wherein a font and a layout of an intermediary word processing input file in the plurality of intermediary word processing input files is based on the template; and converting the intermediary word processing input file to the image.

3. The method of claim 1, wherein the calculating the accuracy score of the OCR process comprises:

calculating a total number of words in the original text file;

calculating a total number of words in the converted text file;

comparing each word in the converted text file to the original text file to determine whether there is an exact match; and calculating a word accuracy percentage based on the determinations of exact matches and based on the total number of words in the original text file and the converted text file.

4. The method of claim 1, wherein a name of the healthcare document is included in a name of the original text file.

5. The method of claim 1, wherein a name of the healthcare document is stored in association with an identifier of the original text file.

6. The method of claim 1, wherein the layout is encoded with symbols or delimiters.

7. The method of claim 1, wherein the layout defined by the template comprises predefined columns or tables.

8. The method of claim 1, wherein the font and layout are applied to the text during the conversion of the original text file to the plurality of images of different file formats.

9. The method of claim 1 further comprising:

subsequent to automatically converting the original text file and prior to causing the OCR process to be executed for each image in the plurality of images, transmitting the plurality of images of different file formats to an OCR computing system that is in network communication with the OCR accuracy testing apparatus, wherein the OCR computing system executes the OCR process, wherein the OCR computing system transmits the converted text file for each image to the OCR accuracy testing apparatus; and receiving the converted text file for each image from the OCR accuracy testing apparatus.

10. The method of claim 1 further comprising:

transmitting the accuracy score of the OCR process for each image in the plurality of images to a user terminal computing device operated by a user, wherein the user terminal computing device presents the accuracy of the OCR process for each image on a display.

11. A computer program product comprising at least one nontransitory computer-readable medium having computer-readable program instructions stored therein, the computer-readable program instructions comprising instructions, which when executed by a processor of an optical character recognition (OCR) accuracy testing apparatus, are configured to cause the OCR accuracy testing apparatus to test an OCR process on a healthcare document by performing acts comprising:

receiving an original text file and a template for the healthcare document, the healthcare document being one of an electronic health record, a lab result, a patient visit record, a triage report, an emergency room report, or a surgery report, wherein the original text file comprises machine-readable text, wherein the template defines at least a font and a layout to be applied to the text in the original text file;

automatically converting the original text file according to the font and the layout defined by the template to generate a plurality of images of different file formats, each image in the plurality of images having pixels indicative of the text, an associated resolution, and the font and the layout defined by the template;

causing the OCR process to be executed for each image in the plurality of images to generate a converted text file for each image, the converted text file for each image comprising second machine-readable text, wherein the second machine-readable text is based upon the pixels;

calculating, with the processor, an accuracy score of the OCR process for each image in the plurality of the images based on a comparison of the text in the original text file and the second text in the converted text file for each image; and flagging an image in the plurality of images when an accuracy score of the OCR process associated with the image is below a threshold score, wherein flagging the image indicates that a problem exists in the OCR process with respect to a file format of the image and the template.

12. The computer program product of claim 11, wherein converting the original text file comprises:

prior to generating the plurality of images of different file formats, converting the original text file to generate a plurality of intermediary word processing input files, wherein a font and a layout of an intermediary word processing input file in the plurality of intermediary word processing input files is based on the template; and converting the intermediary word processing input file to the image.

13. The computer program product of claim 11, wherein the calculating the accuracy score of the OCR process comprises:
   calculating a total number of words in the original text file;
   calculating a total number of words in the converted text file;
   comparing each word in the converted text file to the original text file to determine whether there is an exact match; and
   calculating a word accuracy percentage based on the determinations of exact matches and based on the total number of words in the original text file and the converted text file.

14. The computer program product of claim 11, the acts further comprising:
   subsequent to automatically converting the original text file and prior to causing the OCR process to be executed for each image in the plurality of images, transmitting the plurality of images of different file formats to an OCR computing system that is network communication with the OCR accuracy testing apparatus, wherein the OCR computing system executes the OCR process, wherein the OCR computing system transmits the converted text file for each image to the OCR accuracy testing apparatus; and
   receiving the converted text file for each image from the OCR accuracy testing apparatus.

15. The computer program product of claim 11, the acts further comprising:
   transmitting the accuracy score of the OCR process for each image in the plurality of images to a user terminal computing device operated by a user, wherein the user terminal computing device presents the accuracy of the OCR process for each image on a display.

16. An optical character recognition (OCR) accuracy testing apparatus comprising processing circuitry comprising at least a processor configured to cause the OCR accuracy testing apparatus to test an OCR process on a healthcare document by performing acts comprising:
   receiving an original text file and a template for the healthcare document, the healthcare document being one of an electronic health record, a lab result, a patient visit record, a triage report, an emergency room report, or a surgery report, wherein the original text file comprises machine-readable text, wherein the template defines at least a font and a layout to be applied to the text in the original text file;
   converting the original text file according to the font and the layout defined by the template to generate a plurality of images of different file formats, each image in the plurality of images having pixels indicative of the text, an associated resolution, and the font and the layout defined by the template;
   causing the OCR process to be executed for each image in the plurality of images to generate a converted text file for each image, the converted text file for each image comprising second machine-readable text, wherein the second machine-readable text is based upon the pixels;
   calculating, with the processor, an accuracy score of the OCR process for each image in the plurality of the images based on a comparison of the text in the original text file and the second text in the converted text file for each image; and
   flagging an image in the plurality of images when an accuracy score of the OCR process associated with the image is below a threshold score, wherein flagging the image indicates that a problem exists in the OCR process with respect to a file format of the image and the template.

17. The OCR accuracy testing apparatus of claim 16, wherein converting the original text file comprises:
   prior to generating the plurality of images of different file formats, converting the original text file to generate a plurality of intermediary word processing input files, wherein a font and a layout of an intermediary word processing input file in the plurality of intermediary word processing input files is based on the template; and
   converting the intermediary word processing input file to the image.

18. The OCR accuracy testing apparatus of claim 16, wherein the calculating the accuracy score of the OCR process comprises:
   calculating a total number of words in the original text file;
   calculating a total number of words in the converted text file;
   comparing each word in the converted text file to the original text file to determine whether there is an exact match; and
   calculating a word accuracy percentage based on the determinations of exact matches and based on the total number of words in the original text file and the converted text file.

19. The OCR accuracy testing apparatus of claim 16, the acts further comprising:
   subsequent to automatically converting the original text file and prior to causing the OCR process to be executed for each image in the plurality of images, transmitting the plurality of images of different file formats to an OCR computing system that is network communication with the OCR accuracy testing apparatus, wherein the OCR computing system executes the OCR process, wherein the OCR computing system transmits the converted text file for each image to the OCR accuracy testing apparatus; and
   receiving the converted text file for each image from the OCR accuracy testing apparatus.

20. The OCR accuracy testing apparatus of claim 16, the acts further comprising:
   transmitting the accuracy score of the OCR process for each image in the plurality of images to a user terminal computing device operated by a user, wherein the user terminal computing device presents the accuracy of the OCR process for each image on a display.

* * * * *